US012576353B2

(12) United States Patent
Lee

(10) Patent No.: US 12,576,353 B2
(45) Date of Patent: Mar. 17, 2026

(54) POSITIVELY CHARGED FILTER MATERIAL WITH ABILITY FOR REMOVING CHARGED PARTICLES EFFICIENTLY, AND METHOD FOR PRODUCING SAME

(71) Applicant: TORAY ADVANCED MATERIALS KOREA INC., Gumi-si (KR)

(72) Inventor: Dae Won Lee, Gumi-si (KR)

(73) Assignee: TORAY ADVANCED MATERIALS KOREA INC., Gumi-si (KR)

( * ) Notice: Subject to any disclaimer, the term of this patent is extended or adjusted under 35 U.S.C. 154(b) by 463 days.

(21) Appl. No.: 18/006,401

(22) PCT Filed: Jun. 22, 2021

(86) PCT No.: PCT/KR2021/007791
§ 371 (c)(1),
(2) Date: Jan. 23, 2023

(87) PCT Pub. No.: WO2022/025434
PCT Pub. Date: Feb. 3, 2022

(65) Prior Publication Data
US 2023/0302386 A1 Sep. 28, 2023

(30) Foreign Application Priority Data
Jul. 28, 2020 (KR) ........................ 10-2020-0094011

(51) Int. Cl.
*B01D 39/16* (2006.01)
*B32B 5/02* (2006.01)
(Continued)

(52) U.S. Cl.
CPC .......... *B01D 39/1623* (2013.01); *B32B 5/022* (2013.01); *B32B 5/269* (2021.05);
(Continued)

(58) Field of Classification Search
CPC .... B01D 2239/0428; B01D 2239/0435; B01D 2239/0478; B01D 2239/0618;
(Continued)

(56) References Cited

FOREIGN PATENT DOCUMENTS

JP        57202330        12/1982
JP        04197410        7/1992
(Continued)

OTHER PUBLICATIONS

International Search Report in corresponding PCT Application No. PCT/KR2021/007791, mailed Oct. 19, 2021. (English Translation Provided).
(Continued)

*Primary Examiner* — Dirk R Bass
(74) *Attorney, Agent, or Firm* — NORTON ROSE FULBRIGHT US LLP

(57) ABSTRACT

The present invention relates to a positively charged filter material with excellent ability for removing charged particles efficiently, and a method for producing the same, and more specifically to a positively charged filter material having the ability to selectively remove efficiently, in water, negatively charged organic/inorganic particles, heavy metal ions and pathogenic microorganisms, and a method for producing the same.

9 Claims, 3 Drawing Sheets

(51) Int. Cl.

| | | |
|---|---|---|
| *B32B 5/26* | (2006.01) | |
| *B32B 7/02* | (2019.01) | |
| *D04H 3/007* | (2012.01) | |
| *D04H 3/03* | (2012.01) | |
| *D06N 3/00* | (2006.01) | |
| *D06N 3/12* | (2006.01) | |

(52) U.S. Cl.
CPC ............... *B32B 7/02* (2013.01); *D04H 3/007* (2013.01); *D04H 3/03* (2013.01); *D06N 3/0011* (2013.01); *D06N 3/0013* (2013.01); *D06N 3/0038* (2013.01); *D06N 3/0059* (2013.01); *D06N 3/0084* (2013.01); *D06N 3/12* (2013.01); *B01D 2239/0435* (2013.01); *B01D 2239/0478* (2013.01); *B01D 2239/0618* (2013.01); *B01D 2239/0622* (2013.01); *B01D 2239/0627* (2013.01); *B01D 2239/065* (2013.01); *B01D 2239/10* (2013.01); *B01D 2239/1233* (2013.01); *B32B 2250/03* (2013.01); *B32B 2250/20* (2013.01); *B32B 2250/40* (2013.01); *B32B 2255/02* (2013.01); *B32B 2255/26* (2013.01); *B32B 2262/0253* (2013.01); *B32B 2262/16* (2021.05); *B32B 2307/20* (2013.01); *D06N 2209/04* (2013.01); *D06N 2211/30* (2013.01); *D10B 2321/022* (2013.01); *D10B 2505/04* (2013.01)

(58) Field of Classification Search
CPC .... B01D 2239/0622; B01D 2239/0627; B01D 2239/065; B01D 2239/0654; B01D 2239/10; B01D 2239/1233; B01D 39/14; B01D 39/16; B01D 39/1623; B01D 39/18; B32B 2250/03; B32B 2250/20; B32B 2250/40; B32B 2255/02; B32B 2255/26; B32B 2262/0253; B32B 2262/0269; B32B 2262/0276; B32B 2262/04; B32B 2262/16; B32B 2307/20; B32B 2307/726; B32B 5/022; B32B 5/269; B32B 7/02; D04H 13/00; D04H 3/007; D04H 3/03; D04H 3/12; D06M 10/025; D06M 13/11; D06M 15/55; D06M 15/61; D06M 16/00; D06M 2101/06; D06M 2101/20; D06M 2101/32; D06M 2101/34; D06N 2209/04; D06N 2211/30; D06N 3/0011; D06N 3/0013; D06N 3/0038; D06N 3/0059; D06N 3/0084; D06N 3/12; D10B 2321/022; D10B 2505/04

See application file for complete search history.

(56) References Cited

FOREIGN PATENT DOCUMENTS

| | | | | | |
|---|---|---|---|---|---|
| JP | 11-262660 | 9/1999 | | | |
| JP | 2004156163 | 6/2004 | | | |
| JP | 2005531361 | 10/2005 | | | |
| JP | 201154295 | 3/2011 | | | |
| JP | 201131208 | 7/2011 | | | |
| KR | 10-2004-0088046 | 10/2004 | | | |
| KR | 10-0682289 | 2/2007 | | | |
| KR | 10-0946979 | 3/2010 | | | |
| KR | 10-2012-0024569 | 3/2012 | | | |
| KR | 20150079152 | 7/2015 | | | |
| KR | 10-2018-0069716 | 6/2018 | | | |
| KR | 20180069716 | A | * | 6/2018 | ............... C02F 1/44 |
| KR | 10-2018-0109289 | 10/2018 | | | |
| KR | 20180109289 | A | * | 10/2018 | ............. C02F 1/001 |
| WO | WO 2000/030730 | 6/2000 | | | |

OTHER PUBLICATIONS

Office Action issued in corresponding Korean Patent Application No. 10-2020-0094011 dated Mar. 19, 2025. (Korean Translation Only).

* cited by examiner

No coating (x500)

No coating (x5K)

coating (x500)

coating (x5K)

POSITIVELY CHARGED FILTER MATERIAL WITH ABILITY FOR REMOVING CHARGED PARTICLES EFFICIENTLY, AND METHOD FOR PRODUCING SAME

CROSS-REFERENCE TO RELATED APPLICATION

This application is a national phase application under 35 U.S.C. § 371 of International Application No. PCT/KR2021/007791, filed Jun. 22, 2021, which claims priority to and the benefit of Korean Application No. 10-2020-0094011, filed Jul. 28, 2020. The contents of the referenced patent applications are incorporated into the present application by reference.

FIELD OF THE DISCLOSURE

The present invention relates to a positively charged filter material with excellent ability for removing charged particles efficiently, and a method for producing the same, and more specifically to a positively charged filter material having the ability to selectively remove efficiently, in water, negatively charged organic/inorganic particles, heavy metal ions and pathogenic microorganisms, and a method for producing the same.

DESCRIPTION OF RELATED ART

In general, there are numerous ionic substances and chemicals, including natural organic matter (NOM), in water, which are not removed in the water treatment process and act as causative substances that generate new pollutants.

In addition, recently, the presence of pathogenic microorganisms that cannot be removed by chlorine disinfection has been controversial. For example, pathogenic microorganisms, which are classified as viruses, *cryptosporidium*. Giardia and the like, are discharged into the environment through feces of humans and animals and exist not only in sewage but also in surface water and groundwater. Since these viruses and other pathogenic microorganisms are very small in size, they are hardly treated by general filtration and can live stably for several months or more in water by forming cysts that are resistant to chlorine.

In addition, for drinking water, the standards and regulations for heavy metals such as aluminum, iron, lead and mercury in drinkable water have been notified and utilized by the Ministry of Environment of the Republic of Korea, and continuous analysis and management are in progress to respond to various external environmental changes.

Meanwhile, as described above, in order to remove trace contaminants remaining in water, high coagulation treatment, activated carbon adsorption and membrane filtration have been proposed in the water treatment process, and recently, large-scale research on water treatment processes by using membranes is underway at the national level. In particular, membrane filtration has recently been studied for practical use in advanced water treatment processes, but it has not yet been widely used due to economic costs and technical problems.

For example, Korean Patent Application No. 10-2004-0088046 introduces a technique for producing a positively charged filter by using glass fiber as a basic filter medium for producing an antiviral filter medium, adding a positively charged inorganic compound during the manufacture of glass fiber, and adsorbing and removing viruses by using the same, but due to the use of glass fiber, there have been problems in that the suitability of the water treatment process is concerned due to controversy over harmfulness such as carcinogenesis, and the product group cannot be diversified due to compounds added during the manufacture by using glass fiber.

Accordingly, there is a growing need to develop a positively charged filter material with excellent removal ability for negatively charged fine particles, heavy metal ions and pathogenic microorganisms, low harmfulness and excellent flow rate and filtration pressure.

The present invention has been devised to solve the above-described problems, and the first problem to be solved by the present invention is to provide a positively charged filter material with excellent removal ability for negatively charged organic/inorganic particles, heavy metal ions and pathogenic microorganisms contained in water, low harmfulness and excellent flow rate and filtration pressure.

In addition, the second problem to be solved by the present invention is to provide a production method with improved productivity as a method for producing a positively charged filter material having excellent selective removal ability.

SUMMARY

In order to solve the above-described problems, the present invention provides a positively charged filter material, including a porous support which includes at least one fiber selected from polypropylene (PP) fiber, polyethylene (PE) fiber, polyester fiber, nylon fiber and cellulose fiber and is surface-modified by atmospheric-pressure plasma surface treatment; and a positively charged coating layer which is formed by coating a positively charged coating composition including at least one solvent selected from $C_2$ to $C_5$ alcohol, acetone and water ($H_2O$), a polyfunctional amine compound and a crosslinking agent that performs an epoxy reaction with the polyfunctional amine compound on the surface and inside of the porous support, wherein the weight of the positively charged coating layer is 5% to 15% of the weight of the porous support.

In a preferred exemplary embodiment of the present invention, the porous support may be a composite non-woven fabric having a layered structure of a spun bond non-woven fabric in the upper and lower layers and a melt blown non-woven fabric in the middle layer.

In a preferred exemplary embodiment of the present invention, the average fiber diameter of the upper and lower layers may be 10 μm to 30 μm, the average fiber diameter of the middle layer may be 1 μm to 30 μm, and the average fiber diameter of the composite non-woven fabric may be 5 μm to 25 μm.

In a preferred exemplary embodiment of the present invention, the polyfunctional amine compound may be included in an amount of 1 to 10 parts by weight based on 100 parts by weight of the positively charged coating composition.

In a preferred exemplary embodiment of the present invention, the positively charged coating composition may satisfy Condition Formula 1) below:

$$0.4 \leq C_{amine}/C_{cl} \leq 6 \tag{1}$$

wherein in Condition Formula 1) above, $C_{amine}$ represents the weight-based content of the polyfunctional amine compound for the positively charged coating composition, and $C_{cl}$ represents the weight-based content of the crosslinking agent.

In a preferred exemplary embodiment of the present invention, the polyfunctional amine compound may be at least one selected from the group consisting of diphenyl amine, polyethylene imine, diethylene triamine, dimethylene piperazine and piperazine.

In a preferred exemplary embodiment of the present invention, the polyfunctional amine compound may be 30 mol % or less of tertiary amine.

In a preferred exemplary embodiment of the present invention, the crosslinking agent may be an aliphatic epoxy compound including at least one selected from polyethylene glycol diglycidyl ether, sorbitol polyglycidyl ether, diethylene glycol diglycidyl ether and propylene glycol diglycidyl ether.

Further, in order to solve the above-described problems, the present invention provides a method for producing a positively charged filter material, including the steps of: (1) performing surface modification for a porous support including at least one fiber selected from polypropylene (PP) fiber, polyethylene (PE) fiber, polyester fiber, nylon fiber and cellulose fiber by performing atmospheric-pressure plasma treatment; (2) contacting the surface-modified porous support with a positively charged coating composition including at least one solvent selected from $C_2$ to $C_5$ alcohol, acetone and water ($H_2O$), a polyfunctional amine compound and a crosslinking agent that performs an epoxy reaction with the polyfunctional amine compound to coat the positively charged coating composition on the porous support; and (3) forming a positively charged coating layer by thermally crosslinking the porous support coated with the positively charged coating composition.

In a preferred exemplary embodiment of the present invention, step (3) may be performed by satisfying Condition Formula 2), 3) or 4) below:

$$60° C. \le T_r < 90° C., 250 \ s \le t_r \le 600 \ s \qquad 2)$$

$$90° C. \le T_r < 110° C., 100 \ s \le t_r \le 300 \ s \qquad 3)$$

$$110° C. \le T_r < 130° C., 60 \ s \le t_r \le 150 \ s \qquad 4)$$

wherein in Condition Formulas 2) to 4) above. $T_r$ represents the thermal crosslinking temperature (° C.), and $t_r$ represents the thermal crosslinking time (sec).

The positively charged filter material according to the present invention has excellent selective removal performance for negatively charged organic/inorganic particles, heavy metal ions and pathogenic microorganisms, and is less harmful to the human body, and the flow rate and filtration pressure can be implemented at the same level as conventional filter materials.

When a positively charged filter material is produced according to the production method of the present invention, there is an advantage in that a positively charged coating layer can be uniformly formed and productivity can also be improved.

DETAILED DESCRIPTION OF THE INVENTION

Figure 1:
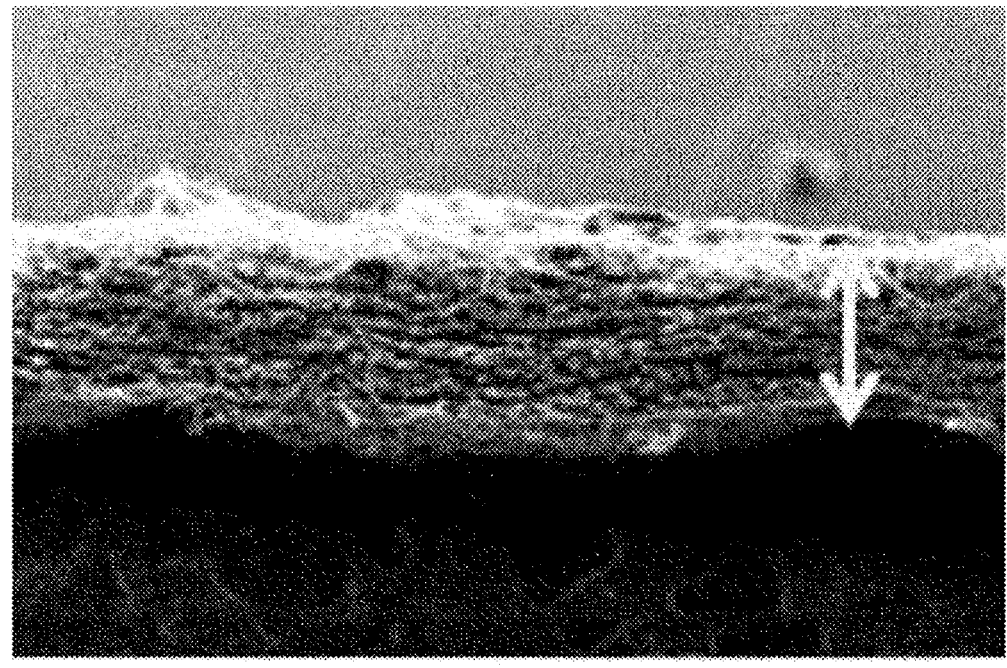
FIG. 1 is an image obtained by photographing the cross-section of a positively charged filter material according to an exemplary embodiment of the present invention.

Hereinafter, with reference to the accompanying drawings, exemplary embodiments of the present invention will be described in detail so that those of ordinary skill in the art can easily practice the present invention. The present invention may be embodied in many different forms, and is not limited to the exemplary embodiments described herein.

In general, microfiber filters that are widely used for water treatment have a disadvantage in that filtration efficiency is low because a filtration area is small and there is no electrostatic force, and a membrane filter has a disadvantage in that filtration efficiency is high but pressure loss is large.

In addition, the conventional positively charged filter material has a problem in safety by using a material suspected of being harmful to the human body, and has a disadvantage in that the selective removal performance for pathogenic microorganisms is not sufficient or the productivity during the manufacture is bad.

In order to solve these problems, the present invention has sought to solve the above-described problems by providing a positively charged filter material, including a porous support which includes at least one fiber selected from polypropylene (PP) fiber, polyethylene (PE) fiber, polyester fiber, nylon fiber and cellulose fiber and is surface-modified by atmospheric-pressure plasma surface treatment; and a positively charged coating layer which is formed by coating a positively charged coating composition including at least one solvent selected from $C_2$ to $C_5$ alcohol, acetone and water ($H_2O$), a polyfunctional amine compound and a crosslinking agent that performs an epoxy reaction with the polyfunctional amine compound on the surface and inside of the porous support, wherein the weight change ratio is 5% to 15%.

Since the positively charged filter material according to the present invention uses a support including at least one fiber selected from polypropylene fiber, polyethylene fiber, polyester fiber, nylon fiber and cellulose fiber instead of glass fiber as a porous support, it has advantages in that it is safe from harmful effects to the human body caused by glass fiber, and it can be applied to various product groups.

In addition, since the surface of the porous support as described above is generally hydrophobic, it is difficult to uniformly coat the positively charged coating composition having hydrophilicity, but the present invention solved this problem by improving the hydrophilic property of the surface of the porous support through plasma surface treatment, and there is an advantage in that the positively charged coating composition can be formed more uniformly.

In addition, the weight of the positively charged coating layer included in the positively charged filter material according to the present invention has a range of 5% to 15% based on the weight of the porous support.

If the weight ratio is less than 5%, there may be a problem in that the use cycle is reduced for relatively less coated parts, and if the weight ratio is more than 15%, the drying efficiency in the manufacturing process decreases, which is disadvantageous in terms of efficiency and economic feasibility.

Hereinafter, each configuration will be described in detail. First, the positively charged filter material according to the present invention will be described.

The positively charged filter material according to the present invention includes at least one fiber selected from polypropylene (PP) fiber, polyethylene (PE) fiber, polyester fiber, nylon fiber and cellulose fiber, and a porous support which is surface-modified by atmospheric-pressure plasma surface treatment.

Among the fibers, polypropylene fiber, polyethylene fiber, polyester fiber and nylon fiber have few hydrophilic groups on the surface and thus have hydrophobicity, and as a result, when coating the positively charged coating composition having the hydrophilicity, uniform coating was difficult due to chemical repulsion between the hydrophilic composition and the hydrophobic support. When the atmospheric-pressure plasma surface treatment is performed, the surface of the porous support is modified to improve hydrophilicity such that it is possible to more uniformly coat the positively charged coating composition.

The porous support serves maintain a constant shape by providing a skeleton in the filter material and filter, and has a number of pores on the surface and inside, and thus, it is possible to remove various contaminants included in the treated water.

The fiber included in the porous support may include at least one selected from the group consisting of polypropylene fiber, polyethylene terephthalate (PET) fiber and polyethylene fiber. Since these fibers have good spinning operability and can be spun to have a uniform thickness, variations in pore size may be reduced, and thus, it is easy to implement a certain level of filtration ability.

As described above, since the porous support includes at least one fiber selected from polypropylene fiber, polyethylene fiber, polyester fiber, nylon fiber and cellulose fiber instead of glass fibers, it has the advantage that it is remarkably less harmful to the human body compared to using glass fibers as a support, and since the brittleness of the fiber is less than that of glass fibers, there is an effect that the durability of the filter material is also substantially improved.

In addition, the porous support may be preferably a non-woven fabric manufactured by using the above-described fiber. The type of non-woven fabric may be selected from commonly used non-woven fabrics, and for example, it may be any one non-woven fabric selected from thermal bonding non-woven fabric, air ray non-woven fabric, wet ray non-woven fabric, needle punching non-woven fabric, spanless (water flow bonding method-Water Zet) non-woven fabric, spun bond non-woven fabric, melt blown non-woven fabric, stitch bond non-woven fabric and electrospinning non-woven fabric, or it may be a composite non-woven fabric including two or more of these structures.

More preferably, the non-woven fabric may be a composite non-woven fabric having a layered structure in which the upper layer and lower layer are spun bond non-woven fabrics, and the middle layer is a melt blown non-woven fabric. The three-layer non-woven fabric, in which the upper and lower layers are spunbond non-woven fabrics and the middle layer is a melt blown non-woven fabric, has remarkably improved tensile strength in both of the machine direction (MD) and the cross direction (CD) compared to the conventional single layer non-woven fabric, and thus, it has an advantage in that the production speed and the coating speed during coating are improved when manufacturing a non-woven fabric having the same level of physical properties.

Figure 2:
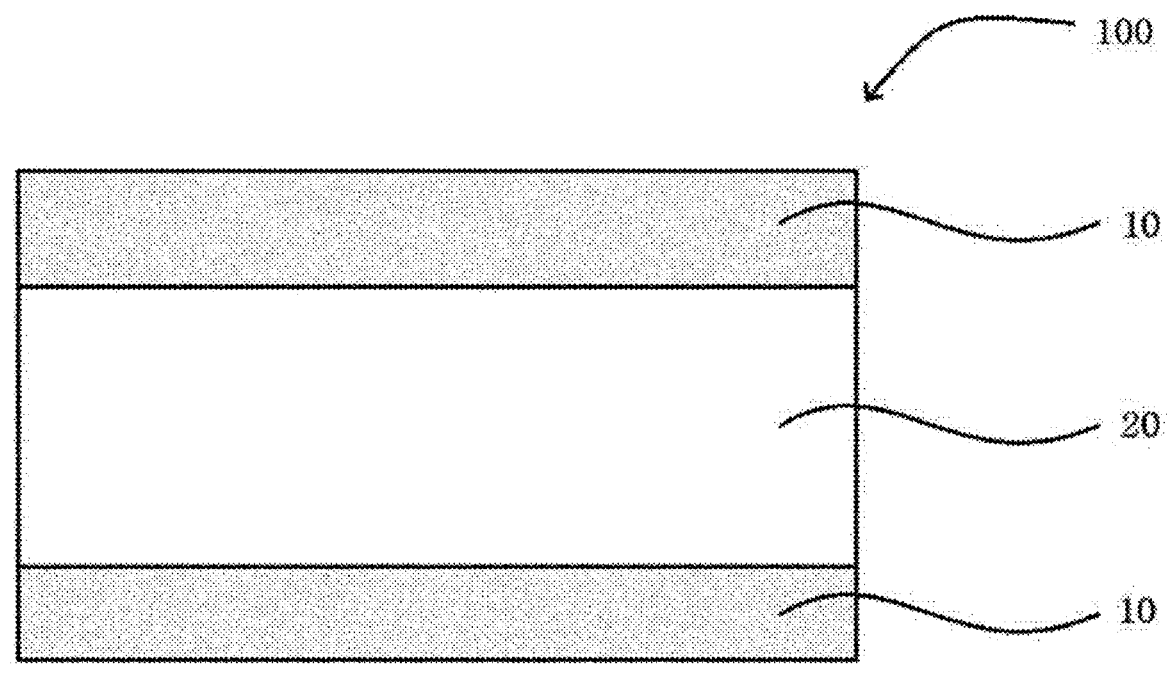
FIG. 2 is a diagram schematically showing the layered structure of a positively charged filter material according to an exemplary embodiment of the present invention.

FIG. 2 is a diagram showing the layered structure of the positively charged filter material according to a preferred exemplary embodiment of the present invention, and particularly, the layered structure of the porous support layer. Referring to FIG. 2, it can be seen that the porous support layer 100 of the positively charged filter material according to the present invention may have the three-layer structure of a spun-bonded non-woven fabric 10, a melt-blown non-woven fabric 20 and a spun-bonded non-woven fabric 10.

Herein, the spun-bonded non-woven fabrics in the upper and lower layers are attached to the upper and lower surfaces of the middle layer of the melt blown non-woven fabric to strengthen the tensile strength of the melt blown non-woven fabric.

More preferably, the composite non-woven fabric having the three-layer structure may have an average fiber diameter of 10 μm to 30 μm in the spun-bonded non-woven fabric of the upper and lower layers. More preferably, it may have an average fineness of 15 μm to 20 μm. If the average fiber diameter of the spun-bonded non-woven fabric of the upper and lower layers is less than 15 μm, the tensile and tear strength of the spun-bonded non-woven fabric is lowered such that the strength of the entire composite non-woven fabric is lowered, and there is a risk that the productivity of the manufacturing process may also be lowered. Conversely, if the average fiber diameter of the spun-bonded layer is more than 30 μm, there may be a problem in that the permeation pressure of the filter material is lowered.

The melt blown non-woven fabric of the middle layer may have an average fiber diameter of 1 μm to 30 μm. More preferably, it may have an average fiber diameter of 1 μm to 7 μm. If the average fiber diameter of the melt-blown non-woven fabric is less than 1 μm, the tensile and tear strength of the porous support layer decreases, resulting in decreased productivity during the manufacturing process, and the durability and use cycle of the positively charged filter material may be reduced. Conversely, if the average fineness is more than 30 μm, the internal pore diameter is also increased compared to the case where the fiber diameter is relatively small, and thus, it has a disadvantage in that the removal ability is poor.

The composite non-woven fabric may have an overall average fiber diameter of 5 μm to 25 μm. If the overall average fiber diameter is less than 5 μm, the tensile and tear strength of the porous support layer may decrease, resulting in decreased productivity during the manufacturing process, and there may be problems in that the durability and use cycle of the positively charged filter material are reduced. Conversely, if the overall average fiber diameter is more than 25 μm, the processability of the non-woven fabric may deteriorate, and problems may occur in terms of durability and safety, such as a decrease in the service lifespan of the positively charged filter material due to the generation of differential pressure.

In the positively charged filter material according to the present invention, the porous support may have an average pore size of 0.5 μm to 300 μm. More preferably, it may have an average pore size of 10 μm to 150 μm. If the average pore size of the composite non-woven fabric is less than 0.5 μm, problems may occur in terms of instantaneous flow rate and use cycle. In addition, if the average pore size of the composite non-woven fabric is more than 300 μm, there may be problems in terms of the uniformity and stability of the removal performance of microorganisms that are present in the treated water even if positive charge coating is performed.

The porous support according to the present invention may preferably have an average thickness of 0.2 mm to 2 mm, and more preferably have an average thickness of 0.3 mm to 1 mm. The average thickness may be a value obtained by arithmetic mean of values obtained by measuring thicknesses at 10 different points. If the average thickness of the porous support is less than 0.2 mm, there may be a problem in that a sufficient thickness for depth filtration is not formed, and thus, the adsorption performance due to the high flow rate of the treated water is reduced. In addition, if the average thickness of the porous support is more than 2 mm, the processability of the porous support is deteriorated, and there may be problems in terms of durability and stability, such as a decrease in the service lifespan of the positively charged filter material due to the generation of differential pressure.

When the porous support is a composite non-woven fabric including the spun-bonded non-woven fabric in the upper and lower layers and the melt blown non-woven fabric in the middle layer as described above, the average thickness of the middle layer of the melt blown non-woven fabric may be preferably 0.15 mm to 1.5 mm. More preferably, it may have an average thickness of 0.25 mm to 0.7 mm. If the average thickness of the melt-blown non-woven fabric in the middle layer is less than 0.15 mm, there may be a problem in that a sufficient thickness for depth filtration is not formed, and thus, the adsorption performance due to the high flow rate of the treated water is reduced. In addition, if the average thickness of the melt blown non-woven fabric in the middle layer is more than 1.5 mm, the thickness of the entire porous support becomes thick, and the processability of the porous support decreases, and there is a problem in terms of durability and stability, such as a decrease in service lifespan of the positively charged filter material due to the generation of differential pressure.

The porous support may preferably have an average weight (basis weight) of 30 g/m$^2$ to 150 g/m$^2$, and preferably have a basis weight of 50 g/m$^2$ to 100 g/m$^2$. If the basis weight of the porous support is less than 30 g/m$^2$, the breaking strength of the non-woven fabric is lowered and there is a problem in the process due to the problem of breaking during coating and processing. In addition, if the basis weight of the porous support is more than 150 g/m$^2$, there may be problems such as a rapid decrease in service lifespan, such as the generation of differential pressure due to a dense structure due to an increase in fiber density in the volume of the support.

When the porous support is the above-described layered composite non-woven fabric, the spun-bonded non-woven fabric of the upper and lower layers may preferably have a basis weight of 30 g/m$^2$ to 300 g/m$^2$. If the basis weight of the spun-bonded non-woven fabric is less than 30 g/m$^2$, there may be a problem in that the tensile strength is lowered.

In addition, the melt blown non-woven fabric may have a basis weight of 1 g/m$^2$ to 10 g/m$^2$. If the basis weight of the melt blown non-woven fabric is less than 1 g/m$^2$, there may be a problem in that the removal rate is lowered, and conversely, if the basis weight is more than 10 g/m$^2$, there may be a problem in that the tensile strength is lowered.

Hereinafter, the positively charged coating layer formed by coating the surface and the inside of the porous support will be described.

The positively charged coating layer is a layer formed by coating a positively charged coating composition on the surface and inside of the porous support and thermally crosslinking the same, and preferably, it may be coated on the surface and strands of the fibers included in the surface and inside of the porous support.

By applying an electric charge to the porous support layer having the above-described hydrophobicity by the positively charged coating layer, it is possible to exhibit the selective removal performance for negatively charged organic/inorganic particles, heavy metal ions and pathogenic microorganisms included in the treated water.

The positively charged coating layer may preferably have an average thickness of 0.01 μm to 3 μm. Preferably, it may have an average thickness of 0.05 μm to 1 μm. If the average thickness of the positively charged coating layer is less than 0.01 μm, there may be a problem of physical property deviation due to a decrease in the uniformity of the positively charged coating layer. In addition, if the average thickness of the positively charged coating layer is more than 3 μm, there may be a problem in terms of durability and stability because the positively charged coating composition to be described below is not sufficiently coated and is eluted.

Hereinafter, the positively charged coating composition for forming the positively charged coating layer will be described in detail.

The positively charged coating composition includes at least one solvent selected from C$_2$-C$_5$ alcohol, acetone and water, a polyfunctional amine compound and a crosslinking agent that performs an epoxy reaction with the polyfunctional amine compound. The positively charged coating composition may further include a penetrant.

Hereinafter, each component will be described in detail.

The solvent uses at least one solvent selected from C$_2$-C$_5$ alcohol, acetone and water, and in the case of a filter material having a porous support of a hydrophobic component such as polypropylene fiber in the conventional positively charged filter material, the efficiency of the coating was improved by using a surfactant and an organic solvent in order to improve the wettability of the support. However, it causes the surfactant or organic solvent to remain in the finished positively charged filter material such that there were problems in terms of unstable initial dissolution of the positively charged filter material and reduced productivity such as requiring additional washing, and there was also a problem of low tensile strength of the nonwoven fabric. In the present invention, by using the above-described hydrophilic solvent, there are effects that the use of a surfactant is unnecessary, the residual solvent may be minimized to significantly improve productivity, and it is possible to solve the problem of the tensile strength of non-woven fabrics being lowered, thereby extending the durability and use cycle of the filter material. For the solvent, preferably, water may be used, and the content of the solvent may be 85 parts by weight to 98.85 parts by weight, and more preferably, 94 parts by weight to 98.7 parts by weight, based on 100 parts by weight of the composition.

The polyfunctional amine compound serves to impart a positive charge to the positively charged coating composition and the positively charged filter material coated with the composition, and one that does not affect the physical properties of the porous support must be used. Preferably, the polyfunctional amine compound may be at least one selected from the group consisting of diphenyl amine, polyethylene imine, diethylene triamine, dimethylene piperazine and piperazine, and preferably, polyethyleneimine having a high positive charge density and reacting with a crosslinking agent to easily impart a positive charge may be used.

In this case, the polyfunctional amine compound may have a weight average molecular weight of 1,000 g/mol to 1,000,000 g/mol, and preferably, 2,000 g/mol to 700,000 g/mol. If the weight average molecular weight of the polyfunctional amine compound is less than 1,000 g/mol, an elution problem may occur due to water pressure due to durability issues. In addition, if the weight average molecular weight of the polyfunctional amine compound is more than 1,000,000 g/mol, there may be a problem in that the reliability of the product may be deteriorated due to a decrease in coating uniformity due to an increase in viscosity and a deviation in performance due to a decrease in durability.

In addition, the polyfunctional amine compound may be included in an amount of 1 to 10 parts by weight, and preferably, 1 to 4 parts by weight, based on 100 parts by weight of the positively charged coating composition. If the polyfunctional amine compound is included in an amount of less than 1 part by weight based on 100 parts by weight of the positively charged coating composition, there is a risk of a decrease in coating properties and a decrease in coating uniformity due to a lack of quantity of the positively charged coating composition. In addition, if the polyfunctional amine compound is included in an amount of more than 10 parts by weight based on 100 parts by weight of the positively charged coating composition, the viscosity of the positively charged coating composition may become excessively high such that it may not be coated to the inside of the porous support, and furthermore, due to a decrease in the average pore size of the non-woven fabric, problems with flow rate and service lifespan degradation may appear.

In a preferred exemplary embodiment of the present invention, the polyfunctional amine compound may include a primary amine and a secondary amine, and may also include a tertiary amine, but the mole fraction of the tertiary amine may be 30 mol % or less. Since primary amines and secondary amines have less steric hindrance compared to tertiary amine compounds, it is easy to perform an epoxy reaction, and it is possible to minimize unreacted residual amine compounds, and it has an advantage that it is possible to facilitate the formation of a uniform positively charged coating layer.

The primary amine, secondary amine or tertiary amine may be included in one molecule. In this case, it means that the mole fraction of tertiary nitrogen is 50 mol % or more by comparing the number of each amine functional group.

The crosslinking agent serves not only as a crosslinking agent and a binder between the polyfunctional amine compounds, but also in a preferred exemplary embodiment of the present invention, the crosslinking agent may be an aliphatic epoxy compound including at least one selected from polyethylene glycol diglycidyl ether, sorbitol polyglycidyl ether, diethylene glycol polyglycidyl ether and propylene glycol diglycidyl ether.

The crosslinking agent may be included in an amount of 0.1 to 2 parts by weight, and preferably, 0.2 to 1 parts by weight, based on 100 parts by weight of the positively charged coating composition. If the crosslinking agent is included at less than 0.1 parts by weight based on 100 parts by weight of the positively charged coating composition, the content for the crosslinking reaction with the polyfunctional amine compound is insufficient, and there may be problems in that residues for unreacted polyfunctional amine compound may be generated.

In addition, if the cross-linking agent is included at more than 2 parts by weight based on 100 parts by weight of the positively charged coating composition, the surface energy is lowered such that the adsorption capacity for viruses and anionic particles or microorganisms may be reduced.

In addition, the contents of the polyfunctional amine compound and the crosslinking agent compound may satisfy Condition Formula 1) below.

$$0.4 \leq C_{amine}/C_{cl} \leq 6 \qquad\qquad 1)$$

wherein in Condition Formula 1) above, $C_{amine}$ represents the weight-based content of the polyfunctional amine compound for the positively charged coating composition, and $C_{cl}$ represents the weight-based content of the crosslinking agent, respectively.

If $C_{amine}/C_{cl}$ is less than 0.4 or more than 6, the amount of each unreacted residual polyfunctional amine compound or crosslinking agent becomes excessive, and a process for washing the same is additionally required, which leads to a decrease in productivity.

Meanwhile, in general, since the polyfunctional amine compound and the crosslinking agent are materials having hydrophilic properties, there is a problem in that it is difficult to form a coating layer on the surface and inside of the porous support including fibers having hydrophobicity such as polyethylene fibers. Accordingly, in addition to hydrophilic modification of the surface by atmospheric-pressure plasma treatment of the surface of the porous support, a penetrant capable of simultaneously expressing both hydrophilic and hydrophobic properties may be used by including both hydrophilic and hydrophobic functional groups.

The penetrant may be included in the positively charged coating composition, and the penetrant is dissolved in the solvent together with the polyfunctional amine compound and the crosslinking agent to reduce the difference in chemical properties with the porous support when the coating layer is formed on the porous support, thereby inducing the formation of a more uniform coating layer.

The penetrant may be a known anionic, cationic or nonionic penetrant that does not affect the properties of the positively charged coating layer and the porous support in the present invention, and for example, it may include at least one selected from sodium dioctyl sulfosuccinate, potassium cocoyl glycinate, sodium dodecyl sulfate, 2-ethyl-1,3-hexanediol, 2,2,4-trimethyl-1,3-pentanediol, alkyl polyglucoside and alkyl glucamide. However, sodium dioctyl sulfosuccinate may be preferably used to maximize the wetting characteristics of the porous support compared to the amount added, and to improve the efficiency of the washing process when a washing process is required.

In this case, the penetrant may be included in an amount of 0.05 to 1 part by weight, and preferably, 0.07 to 1 part by weight based on 100 parts by weight of the positively charged coating composition. If the penetrant is included in an amount of less than 0.05 parts by weight based on 100 parts by weight of the positively charged coating composition, it is difficult to uniformly apply the penetrant due to the difference in surface energy between the positively charged coating composition and the porous support, whereby there may be a problem in that the coating composition aggregates on the porous support. In addition, if the penetrant is included in an amount of more than 1 part by weight based on 100 parts by weight of the positively charged coating composition, it is possible to maintain the surface energy performance of the porous support after coating at a certain level, but the amount of the penetrant to be removed increases, and as a result, problems such as impurities may occur, and there may be problems in that the efficiency of the process is reduced and productivity is lowered.

In addition, due to the positively charged coating layer formed through the above-described positively charged coating composition, the positively charged filter material according to the present invention may have a surface charge of 15 mV to 40 mV under the condition of pH 7, and preferably have a surface charge of 15 mV to 30 mV.

As such, as the surface charge of the porous support exhibits a positive charge, it has the ability to adsorb and trap organic matter or particles having a negative charge, and if the surface charge of the porous support is less than 15 mV, there may be a problem in that the adsorption capacity for viruses and other organic substances is lowered. In addition, if the surface charge of the porous support is more than 40 mV, the virus adsorption capacity may be maintained above a certain level, but the production cost is increased due to the reaction time and concentration increase to exhibit high surface charge during the manufacturing process, which is not preferable in terms of economic feasibility.

Next, the method for producing a positively charged filter material according to the present invention will be described.

The positively charged filter material according to the present invention may be performed by including the steps of: (1) performing surface modification for a porous support including at least one fiber selected from polypropylene (PP) fiber, polyethylene (PE) fiber, polyester fiber, nylon fiber and cellulose fiber by performing atmospheric-pressure plasma treatment; (2) contacting the surface-modified porous support with a positively charged coating composition including at least one solvent selected from $C_2$ to $C_5$ alcohol, acetone and water ($H_2O$), a polyfunctional amine compound and a crosslinking agent that performs an epoxy reaction with the polyfunctional amine compound to coat the positively charged coating composition on the porous support; and (3) forming a positively charged coating layer by thermally crosslinking the porous support coated with the positively charged coating composition.

Preferably, after step (3), washing and drying may be further included.

First, (1) modifying the surface by atmospheric-pressure treatment of the surface of a porous support is performed. Since the contents of the components, types and thickness of the porous support are the same as those of the above-described positively charged filter material, the description thereof will be omitted.

The surface hydrophilicity and adhesion of the porous support may be improved through atmospheric-pressure plasma treatment. Specifically, atmospheric-pressure plasma treatment is composed of plasma at atmospheric pressure on the porous support, the plasma is preferably plasma shaped from air, and the composition may have a composition of 70 to 85 vol % of nitrogen and 15 to 25 vol % of oxygen.

Plasma treatment is preferably repeated twice, and in each treatment, the porous support may be exposed to plasma for 10 seconds per time.

Atmospheric-pressure plasma surface treatment may be performed by irradiating plasma with an output of 150 W to 200 W. If the plasma output is less than 150 W, there is a problem in that the surface modification of the porous support is not sufficiently performed and the positively charged coating layer is not uniformly formed. In addition, if it is more than 200 W, there may be problems such as deformation of the porous support due to excessive energy, decrease in pore size and decrease in permeation pressure.

(2) Next, the porous support whose surface has been modified by plasma treatment is brought into contact with the above-described positively charged coating composition to coat the positively charged coating composition on the porous support. In this case, the details of the positively charged coating composition are the same as described above.

As a method of contacting the positively charged coating composition to the porous support in step (2), the porous support may be immersed in a solution including the positively charged coating composition, or a spray spraying method may be used. When the immersion method is used, it may be immersed in the solution including the positively charged coating composition at room temperature for 1 second to 120 seconds, and preferably, it may be immersed for 5 seconds to 30 seconds. If the immersion time is less than 1 second, the time for the solution including the positively charged coating composition to penetrate to the inside of the porous support is insufficient such that that it is difficult to uniformly coat and there may be a problem in that the physical properties of the positively charged filter material are deteriorated. In addition, if it is more than 120 seconds, the difference in physical properties according to the increase in coating time is not clear, and thus, it is not preferable for process efficiency.

(3) Next, forming a positively charged coating layer by thermally crosslinking the porous support coated with the positively charged coating composition is performed.

Step (3) may be thermally treated for 60 seconds to 600 seconds at a temperature of 60° C. to 130° C. in a hot air dryer in order to induce a thermal crosslinking reaction of the positively charged coating composition treated on the porous support, and preferably, it may be thermally treated for 60 seconds to 300 seconds at a temperature of 80° C. to 130° C. In this case, it is preferable to expose a relatively long time at a low temperature, and expose a shorter time at a high temperature in the relationship between the heat treatment temperature and time. If the heat treatment temperature and time is less than 60° C. or less than 60 seconds, there may be a problem in that unreacted substances are generated due to insufficient time for thermal crosslinking reaction after solvent drying, and if it is more than 130° C. or 600 seconds, problems may occur where the porous support may be melted or stretched at high temperature and for a long time to cause structural deformation, resulting in non-uniform physical properties.

Step (3) may be preferably performed by satisfying Condition Formula 2), 3) or 4).

$$60° \text{ C.} \leq T_r < 90° \text{ C.}, 250 \text{ s} \leq t_r \leq 600 \text{ s} \qquad 2)$$

$$90° \text{ C.} \leq T_r < 110° \text{ C.}, 100 \text{ s} \leq t_r \leq 300 \text{ s} \qquad 3)$$

$$110° \text{ C.} \leq T_r < 130° \text{ C.}, 60 \text{ s} \leq t_r \leq 150 \text{ s} \qquad 4)$$

In Condition Formulas 2) to 4) above, $T_r$ represents the thermal crosslinking temperature (° C.), and $t_r$ represents the thermal crosslinking time (sec). That is, it is preferable to lengthen the thermal crosslinking time at a low temperature and to shorten the thermal crosslinking time at a high temperature, and if $t_r$ is less than the lower limit of each range in each of the above conditions, there may be a problem in that unreacted substances are generated due to insufficient time for the thermal crosslinking reaction to proceed, and if $t_r$ is more than the upper limit of each range, problems may occur where the porous support may be melted or stretched to cause structural deformation, resulting in non-uniform physical properties.

(4) Subsequently, washing and drying the porous support on which the positively charged coating layer is formed may be further performed. Step (4) may include washing and drying the porous support on which the positively charged coating layer is formed.

The washing is a step of removing unreacted solids or penetrants contained inside and outside the porous support, and preferably, it may be washed by immersing in 1 minute to 20 minutes in water at a temperature of 25° C. to 60° C. or a $C_2$-$C_5$ linear or branched alcohol aqueous solution at 0.1 wt. % to 10 wt. %, and preferably, in an isopropyl alcohol aqueous solution, and preferably, it may be washed by immersing for 2 to 15 minutes in an isopropyl alcohol aqueous solution at 0.1 wt. % to 10 wt. % at a temperature of 25° C. to 45° C. In this case, if the washing is performed at a low temperature of less than 25° C., material exchange does not occur and the problem of reducing the washing effect is expected, and at a temperature of more than 60° C., there is a concern that durability problems may occur when the coated non-woven fabric exceeds the maximum temperature actually used. In addition, if the immersion time is less than 1 minute, there is a problem in that it is difficult to obtain the desired washing effect because sufficient immersion time is not provided, and if it is more than 20 minutes, it may be disadvantageous in terms of economic feasibility because the washing effect against time may not be sufficiently obtained. In this case, in order to improve the washing efficiency of the process, aeration cleaning using air may be added and performed.

Near, the drying may be performed at a temperature of 60° C. to 130° C. for 60 seconds to 600 seconds, and preferably at a temperature of 80° C. to 110° C. for 2 minutes to 5 minutes. If the drying temperature is less than 60° C. or the drying time is less than 60 seconds, sufficient drying may not be achieved, and if the drying temperature is more than 130° C. or the drying time is more than 600 seconds, problems may occur where the non-woven fabric is melted or stretched to cause structural deformation, resulting in non-uniform physical properties.

Hereinafter, the present invention will be described in more detail through the following examples.

The following examples are presented only to illustrate the present invention, and the scope of the present invention is not limited by the following examples.

EXAMPLES

Production Example

Production Example 1

96.4 parts by weight of distilled water as a solvent, 0.1 parts by weight of dioctyl sulfosuccinate as a penetrant, 3 parts by weight of linear polyethyleneimine (Compound A) with a weight average molecular weight of 70,000 g/mol as a polyfunctional amine compound and 0.5 parts by weight of polyethylene glycol diglycidyl ether (PEG DE) as a cross-linking agent were mixed to prepare a positively charged coating composition solution.

Polypropylene fibers having an average fiber diameter of 2 μm were melt-spun to prepare a polypropylene melt-blown non-woven fabric having an average thickness of 0.05 mm and a basis weight of 7 g/m². In addition, a polypropylene composite non-woven fabric was fabricated in which a polypropylene spunbond non-woven fabric having an average thickness of 0.3 mm and a basis weight of 31 g/m² was laminated on the upper and lower layers of the melt-blown non-woven fabric. The polypropylene composite non-woven fabric had an overall average thickness and basis weight of 0.35 mm and 38 g/m², respectively.

The surface of the polypropylene composite non-woven fabric was modified by atmospheric-pressure surface treatment with MyPL Auto-200 equipment at 180 W.

After immersing the surface-modified polypropylene composite non-woven fabric in the positively charged coating composition solution for 5 seconds at 25° C., it was taken out and thermally cross-linked and dried for 2 minutes at 125° C. by using a hot air dryer to form a positively charged coating layer.

Thereafter, the composite non-woven fabric with the positively charged coating layer was washed by immersing for 5 minutes in a 1 wt. % isopropyl alcohol aqueous solution at a temperature of 30° C., followed by drying at a temperature of 90° C. for 3 minutes to produce a positively charged filter material.

Production Examples 2 to 9

Positively charged filter materials were produced in the same manner as in Production Example 1, except that the parameters such as the compositions of the porous support and the positively charged coating composition were changed as shown in Table 1 below.

Production Example 10

A positively charged filter material was produced in the same manner as in Production Example 1 except that the thermal crosslinking time was increased to 3 minutes in the thermal crosslinking step. Other contents are shown in Table 1 below.

Production Example 11

A positively charged filter material was produced in the same manner as in Production Example 1 except that the thermal crosslinking temperature was changed to 70° C. in the thermal crosslinking step. Other contents are shown in Table 1 below.

Production Example 13

A positively charged filter material was produced in the same manner as in Production Example 1, except that the polypropylene melt blown non-woven fabric having an average thickness of 0.35 mm and a basis weight of 40 g/m² was used as the porous support rather than the composite non-woven fabric having a three-layer structure.

Comparative Production Example 1

A positively charged filter material was produced in the same manner as in Production Example 1, except that a crosslinking agent was not added to the positively charged coating composition.

Comparative Production Example 2

A positively charged filter material was produced in the same manner as in Production Example 1, except that the polypropylene composite non-woven fabric was coated with a positively charged coating composition without atmospheric-pressure plasma surface treatment.

Comparative Production Example 3

A positively charged filter material was produced in the same manner as in Production Example 1, except that the polypropylene composite non-woven fabric was not coated with the positively charged coating composition.

Experimental Example 1

1) SEM Imaging

Figure 3:
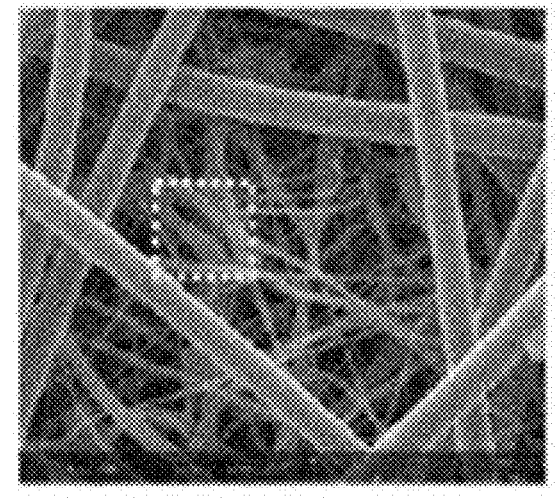
FIG. 3 is an SEM image obtained by photographing the appearance before coating a positively charged coating composition on a composite non-woven fabric included in the positively charged filter material according to an exemplary embodiment of the present invention.
Figure 3:
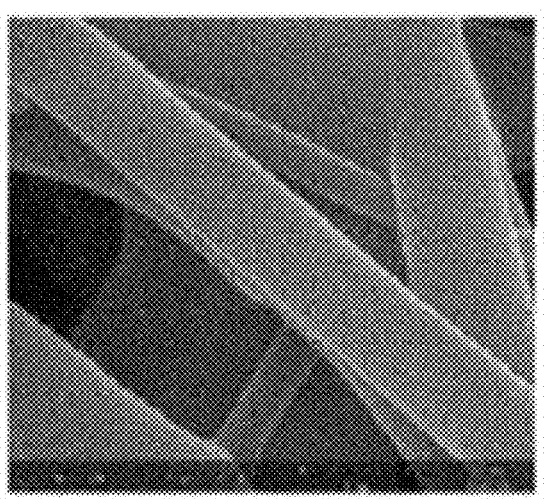
Figure 4:
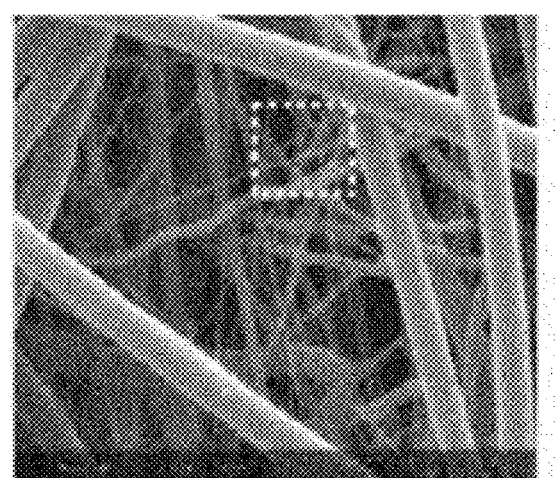
FIG. 4 is an SEM image obtained by photographing the appearance of a positively charged filter material according to an exemplary embodiment of the present invention.
Figure 4:
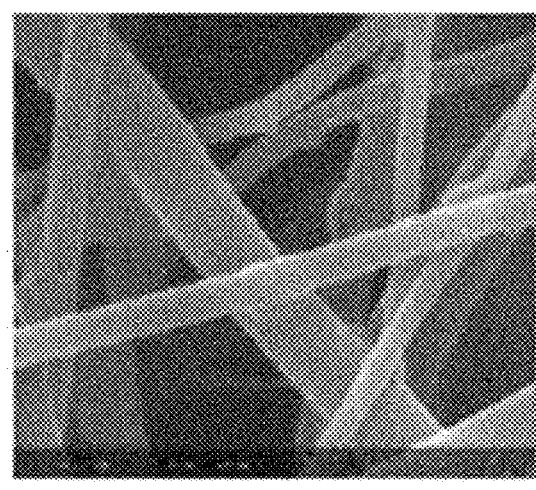

FIG. 3 is an SEM (Maker: SeC, model: SNE-3000M) image of the composite non-woven fabric according to Production Example 1, and FIG. 4 is an SEM image of the positively charged filter material according to Production Example 1.

2) Evaluation of Contact Angle

In order to evaluate the contact angle of the positively charged filter material produced in Production Examples 1 to 12 and Comparative Production Examples 1 to 3, the measurement equipment (Maker: KSV, Model: CAM100) was used for measurement, and the results are shown in Table 1 below.

3) Evaluation of Surface Charge

The surface charges of the positively charged filter materials produced in Production Examples 1 to 12 and Comparative Production Examples 1 to 3 were measured by using a surface flow potential difference measuring device (Maker: Anton, Model: SurPass), and the results are shown in Table 1 below.

4) Evaluation of Weight Increase

In order to evaluate the weight increase of the positively charged filter materials produced in Production Examples 1 to 12 and Comparative Production Examples 1 to 3, an electronic balance (Maker: OHAUS, Model: PAG4102) was used to compare the weight of the positively charged filter material after coating compared to an uncoated positively charged filter material to measure a weight increase, and the results are shown in Table 1 below.

5) Evaluation of Tensile Strength

The tensile strength of the positively charged filter materials produced in Production Examples 1 to 12 and Comparative Production Examples 1 to 3 was measured by KS K 0520 (grab method), and the results are shown in Table 1 below.

TABLE 1

| Classification | Porous support (type, thickness (mm)) | Positively charged coating composition (based on 100 parts by weight) | | | Contact angle (°) | Surface charge (mV) | Weight increase (%) | Tensile strength (gf) | |
|---|---|---|---|---|---|---|---|---|---|
| | | Polyfunctional amine | Cross-linking agent | Penetrant | | | | MD | CD |
| Production Example 1 | PP, SB/BM/SB Surface treatment ○ 0.6/0.25/0.4 | Compound A | 3 | 0.5 | 0.1 | 10.5 | +23.5 | +11.4 | 2,230 | 1,067 |
| Production Example 2 | PP, SB/BM/SB Surface treatment ○ 0.6/0.25/0.4 | Compound A | 5 | 0.5 | 0.1 | wetting | +27.5 | +13.4 | 2,225 | 1,035 |
| Production Example 3 | PP, SB/BM/SB Surface treatment ○ 0.6/0.25/0.4 | Compound A | 0.3 | 1 | 0.1 | 18 | +19 | +7.2 | 2,237 | 1,084 |
| Production Example 4 | PP, SB/BM/SB Surface treatment ○ 0.6/0.25/0.4 | Compound A | 3 | 0.5 | 0.1 | 44 | +13 | +6.7 | 2,243 | 1,096 |
| Production Example 5 | PP, SB/BM/SB Surface treatment ○ 0.6/0.25/0.4 | Compound A | 0.5 | 0.5 | 0.1 | 35 | +7 | +5.2 | 2,2215 | 1,058 |
| Production Example 6 | PP, SB/BM/SB Surface treatment ○ 0.6/0.25/0.4 | Compound A | 3 | 0.5 | — | 8.5 | +21.5 | +10.8 | 2,249 | 1,090 |
| Production Example 7 | PP, SB/BM/SB Surface treatment ○ 0.6/0.25/0.4 | Compound A | 3 | 0.05 | 0.1 | 22 | +16 | +6.9 | 2,260 | 1,099 |
| Production Example 8 | PP, SB/BM/SB Surface treatment ○ 0.6/0.25/0.4 | Compound A | 3 | 3 | 0.1 | 27 | +9 | +5.6 | 2,248 | 1,092 |
| Production Example 9 | PP, SB/BM/SB Surface treatment ○ 0.6/0.25/0.4 | Compound A | 3 | 0.5 | 0.1 | 13.5 | +18.5 | +7.1 | 659 | 506 |
| Production Example 10 | PP, SB/BM/SB Surface treatment ○ 0.6/0.25/0.4 | Compound A | 3 | 0.5 | 0.1 | 11.5 | +25.3 | +12.2 | 2,234 | 1,074 |

TABLE 1-continued

| Classification | Porous support (type, thickness (mm)) | Positively charged coating composition (based on 100 parts by weight) | | | Contact angle (°) | Surface charge (mV) | Weight increase (%) | Tensile strength (gf) | |
|---|---|---|---|---|---|---|---|---|---|
| | | Polyfunctional amine | Cross-linking agent | Penetrant | | | | MD | CD |
| Production Example 11 | PP, SB/BM/SB Surface treatment ○ 0.6/0.25/0.4 | Compound A 3 | 0.5 | 0.1 | 9.5 | +24.6 | +11.9 | 2,257 | 1,079 |
| Comparative Production Example 1 | PP, SB/BM/SB Surface treatment 0.6/0.25/0.4 | Compound A 3 | — | 0.1 | 24 | +14.4 | +4.5 | 2,239 | 1,072 |
| Comparative Production Example 2 | PP, SB/BM/SB Surface treatment ○ 0.6/0.25/0.4 | Compound A 3 | 0.5 | 0.1 | 15 | +7.1 | +3.6 | 2,242 | 1,084 |
| Comparative Production Example 3 | PP, SB/BM/SB Surface treatment ○ 0.6/0.25/0.4 | — | — | — | 78 | <+1 | +0 | 2,238 | 1,075 |
| Comparative Production Example 4 | PP, SB/BM/SB Surface treatment ○ 0.6/0.25/0.4 | Compound A 7 | 1.1 | 0.1 | wetting | +46 | +16.6 | 2,238 | 1,079 |
| Comparative Production Example 5 | PP, SB/BM/SB Surface treatment ○ 0.6/0.25/0.4 | Compound A 12 | 1.5 | 0.1 | wetting | +49.5 | +18.1 | 2,257 | 1,089 |

\* PP: Polypropylene, SB/BM/SB: Spunbond/meltblown/spunbond 3-layer structure, MB: Meltblown single-layer structure
\* Compound A: Linear polyethyleneimie with weight average molecular weight of 70,000 g/mol
\* Compound B: Branched polyethyleneimine with weight average molecular weight of 70,000 g/mol and main chain branching ratio of 80%
\* Crosslinking agent: Polyethylene glycol diglycidyl ether
\* Penetrant: Sodium dioctyl sulfosuccinate Solvent: Water ($H_2O$)
\* wetting: Contact angle cannot be measured because it is completely wet Referring to Table 1, in the positively charged filter material of Comparative Production Example 1, which did not include a crosslinking agent in the positively charged coating composition, the positively charged coating layer was formed significantly less than that of Production Example 1, and it can be seen the weight increase rate was as low as less than 5%, and accordingly, it can be seen that the surface charge also had a low value.

For the positively charged filter material according to Comparative Production Example 2, plasma surface treatment was not performed on the composite non-woven fabric, and accordingly, the hydrophilicity of the surface was not sufficient, and as a result, the positively charged coating layer was not well formed, and the weight increase rate and surface charge were also low.

As a result of not forming the positively charged coating layer in Comparative Production Example 3, it can be seen that the water droplet wetting angle was very large, and the surface charge was very small.

In Comparative Production Examples 4 and 5, it appears that the positively charged coating layer was excessively formed by adding too much polyfunctional amine compound. Therefore, it was found that the weight increase rate was too high. These are expected to result in an excessive decrease in the average pore size in the filter material, resulting in a decrease in permeation pressure and service cycle.

Production Examples 2 and 3 are positively charged filter materials produced by using a composition having an excessively different ratio between the polyfunctional amine compound and the crosslinking agent.

Production Example 4 used a polyfunctional amine compound having a tertiary amine molar fraction of 30 mol % or more (because it is polyethyleneimine with a branching ratio of 80% or more), and it can be seen that the coating was not sufficiently performed according to Production Example 1, and thus, the weight increase rate was low and the contact angle was larger.

It can be seen that the content of the polyfunctional amine compound was too low in Production Example 5, and as a result, the contact angle was large, and the surface charge and weight increase rate were low.

Production Example 6 used a positively charged coating composition that did not include a penetrant, and as a result of performing surface modification of the porous support of the present invention by atmospheric-pressure plasma, a positively charged filter material having almost similar properties to those of Production Example 1 was obtained without a penetrant. Production Example 7 used a positively charged coating composition with a very low content of the crosslinking agent at 0.05 parts by weight, and since the content of the crosslinking agent was too low, it generated an unreacted polyfunctional amine compound that did not react with the porous support, and thus, it can be seen that the weight increase rate and surface charge of the positively charged filter material were low.

In Production Example 8, the content of the crosslinking agent was too much at 3 parts by weight, and the surface charge was very low at about 9 mV.

In Production Example 9, a positively charged filter material was produced by using a polypropylene melt blown non-woven fabric alone as a porous support without a spun bond non-woven fabric, and it can be seen that the tensile strength was significantly lower than that of Production Example 1.

In Production Example 10 and Production Example 11, the temperature and crosslinking time in the thermal cross-linking process were different from each other, and in Production Example 10, it can be seen that the formation of the positively charged coating layer by the crosslinking reaction was not sufficiently achieved. Production Example 11 did not show a significant difference in physical properties from Production Example 1 at the current stage.

EXAMPLE

Example 1

In order to manufacture a filter cartridge including the positively charged filter produced in Production Example 1, after rolling and inserting a non-woven fabric at a length of 3.5 into a polypropylene core having an outer diameter of 14 mm and cutting to an outer diameter of 47 mm and a length of 116 mm, upper/lower end capping was performed. A filter cartridge was manufactured by inserting the thus prepared cartridge into a housing such that the inlet portion and the permeation portion were distinguished.

Comparative Examples 1 to 3

Filter cartridges were manufactured in the same manner as in Example 1, except that the positively charged filter material was changed as shown in Table 2 below.

| Filter cartridge | Positively charged filter material |
|---|---|
| Example 1 | Production Example 1 |
| Example 2 Comparative Example 1 | Comparative Production Example 1 |
| Example 3 Comparative Example 2 | Comparative Production Example 2 |
| Example 4 Comparative Example 3 | Comparative Production Example 3 |
| Example 5 Comparative Example 4 | Comparative Production Example 4 |
| Example 6 Comparative Example 5 | Comparative Production Example 5 |

Experimental Example 2

Based on the Ministry of Environment Notice No. 2013-136 of the drinking water quality process test standards, the analysis was requested by the Korea Environment and Water Research Institute, and the results are shown in Table 3 below.

TABLE 3

| Classification | | Example 1 | Comparative Example 1 | Comparative Example 2 | Comparative Example 3 | Comparative Example 4 | Comparative Example 5 |
|---|---|---|---|---|---|---|---|
| *Escherichia coli* 2,100 CFU/mL | Number of passages (CFU/mL) | 0 | 378 | 819 | 1,197 | 0 | 0 |
| | Removal rate (%) | >99.9 | 82 | 61 | 43 | >99.9 | >99.9 |
| *Psuedomonas aeruginosa* 1,900 CFU/mL | Number of passages (CFU/mL) | 0 | 627 | 494 | 912 | 0 | 0 |
| | Removal rate (%) | >99.9 | 67 | 74 | 52 | >99.9 | >99.9 |
| *Salmonella* 2,900 CFU/mL | Number of passages (CFU/mL) | 0 | 696 | 1,247 | 1,479 | 0 | 0 |
| | Removal rate (%) | >99.9 | 76 | 57 | 49 | >99.9 | >99.9 |
| *Staphylococcus aureus* 2,800 CFU/mL | Number of passages (CFU/mL) | 0 | 756 | 980 | 1,652 | 0 | 0 |
| | Removal rate (%) | >99.9 | 73 | 65 | 41 | >99.9 | >99.9 |

Referring to Table 3, it can be seen that the positively charged filter materials according to Comparative Examples 1 to 3, in which the positively charged coating layer was not sufficiently formed, had very poor removal ability against pathogenic organisms compared to the positively charged filter material according to Example 1. Comparative Examples 4 and 5 had an excessively positively charged coating layer and thus had sufficient removal ability, but had a problem in that the permeation pressure was lowered because the average pore size of the support was too small.

The invention claimed is:

1. A positively charged filter material, comprising:
a porous support which comprises at least one fiber selected from polypropylene (PP) fiber, polyethylene (PE) fiber, polyester fiber, nylon fiber and cellulose fiber and is surface-modified by atmospheric-pressure plasma surface treatment; and a positively charged coating layer which is formed by coating a positively charged coating composition comprising at least one solvent selected from $C_2$ to $C_5$ alcohol, acetone and water ($H_2O$), a polyfunctional amine compound and a crosslinking agent that performs an epoxy reaction with the polyfunctional amine compound on the surface and inside of the porous support, wherein the weight of the positively charged coating layer is 5% to 15% of the weight of the porous support, wherein the porous support is a composite non-woven fabric having a layered structure of a spun bond non-woven fabric in an upper layer and a lower layer and a melt blown non-woven fabric that has a basis weight of 1 to 10 g/m² in a middle layer positioned between the upper and lower layers, and wherein the composite non-woven fabric has an average thickness of 0.2 to 2 mm, and a basis weight of 30 to 150 g/m².

2. The positively charged filter material of claim 1, wherein the average fiber diameter of the upper and lower layers is 10 μm to 30 μm, the average fiber diameter of the middle layer is 1 μm to 30 μm, and the average fiber diameter of the composite non-woven fabric is 5 μm to 25 μm.

3. The positively charged filter material of claim 1, wherein the polyfunctional amine compound is comprised in an amount of 1 to 10 parts by weight based on 100 parts by weight of the positively charged coating composition.

4. The positively charged filter material of claim 1, wherein the positively charged coating composition satisfies Condition Formula 1) below:

$$0.4 \leq C_{amine}/C_{cl} \leq 6 \qquad \qquad 1)$$

wherein in Condition Formula 1) above, $C_{amine}$ represents the weight-based content of the polyfunctional amine compound for the positively charged coating composition, and $C_{cl}$ represents the weight-based content of the crosslinking agent.

5. The positively charged filter material of claim 1, wherein the polyfunctional amine compound is at least one selected from the group consisting of diphenyl amine, polyethylene imine, diethylene triamine, dimethylene piperazine and piperazine.

6. The positively charged filter material of claim 1, wherein the polyfunctional amine compound is 30 mol % or less of tertiary amine.

7. The positively charged filter material of claim 1, wherein the crosslinking agent is an aliphatic epoxy compound comprising at least one selected from polyethylene glycol diglycidyl ether, sorbitol polyglycidyl ether, diethylene glycol diglycidyl ether and propylene glycol diglycidyl ether.

8. A method for producing a positively charged filter material, comprising the steps of:

(1) performing surface modification for a porous support comprising at least one fiber selected from polypropylene (PP) fiber, polyethylene (PE) fiber, polyester fiber, nylon fiber and cellulose fiber by performing atmospheric-pressure plasma treatment;

(2) contacting the surface-modified porous support with a positively charged coating composition comprising at least one solvent selected from $C_2$ to $C_5$ alcohol, acetone and water ($H_2O$), a polyfunctional amine compound and a crosslinking agent that performs an epoxy reaction with the polyfunctional amine compound to coat the positively charged coating composition on the porous support; and (3) forming a positively charged coating layer by thermally crosslinking the porous support coated with the positively charged coating composition, wherein the porous support is a composite non-woven fabric having a layered structure of a spun bond non-woven fabric in the upper and lower layers and a melt blown non-woven fabric that has a basis weight of 1 to 10 g/m² in the middle layer, and wherein the composite non-woven fabric has an average thickness of 0.2 to 2 mm, and a basis weight of 30 to 150 g/m².

9. The method of claim 8, wherein step (3) is performed by satisfying Condition Formula 2), 3) or 4) below:

$$60° \text{ C.} \leq T_r < 90° \text{ C.}, 250 \text{ s} \leq t_r \leq 600 \text{ s} \qquad \qquad 2)$$

$$90° \text{ C.} \leq T_r < 110° \text{ C.}, 100 \text{ s} \leq t_r \leq 300 \text{ s} \qquad \qquad 3)$$

$$110° \text{ C.} \leq T_r < 130° \text{ C.}, 60 \text{ s} \leq t_r \leq 150 \text{ s} \qquad \qquad 4)$$

wherein in Condition Formulas 2) to 4) above, $T_r$ represents the thermal crosslinking temperature (° C.), and $t_r$ represents the thermal crosslinking time (sec).

* * * * *